SWITCH CONNECTOR

Filed Sept. 15, 1964

Inventor
John H. Krehbiel
By: Olson, Trexler, Wolters & Bushnell
Attys

United States Patent Office 3,275,766

Patented Sept. 27, 1966

3,275,766
SWITCH CONNECTOR

John H. Krehbiel, Brookfield, Ill., assignor to Molex Products Company, Downers Grove, Ill., a corporation of Illinois Filed Sept. 15, 1964, Ser. No. 396,631
3 Claims. (Cl. 200—51)

The present invention relates to a novel connector for an electrical switch, and more specifically to a novel switch connector having particular utility as a combination phonograph record changer switch-amplifier connector. More particularly yet, the invention relates to a unique connector for a snap action or slide switch for a record changer to simplify the connection of wires to the record changer and to an amplifier therefor.

The switch to which this invention relates, but to which the invention is not to be limited may be a conventional snap action or slide switch for use with a record changer of a phonograph. Such a switch usually has a switch arm which actuates a record changer responsive to the position of a phonograph tone arm on a phonograph record or which may be actuated manually.

Typically such a switch is provided with a plurality of lead wires; and after securement of the switch to the record changer, the lead wires are connected operatively to a receptacle located some distance away. Other phonograph wires are provided for suitable connection to one or more amplifiers. Additionally, suitable lines are provided for electrical actuation of the record changer or phonograph motor.

As will be understood, each additional step in the assembly of a phonograph record changer requires additional expenditure of time and costs the manufacturer money, resulting in additional manufacturing costs which must be passed on to the ultimate consumer.

A pair of wires from the record changer switch must be connected to the record changer motor. Other wires must be connected to one or more phonograph amplifiers. And still other wires are connected to an electrical receptacle.

Sequentially, the record changer switch must be connected to the record changer; a pair of wires must be connected to the record changer or phonograph motor; and a plurality of wires must be connected to the phonograph amplifiers. As will be appreciated, making such individual connections takes additional time.

Thus, it is an object of the present invention to provide a connector device suitable for slip-on connection between a record changer switch and a record changer motor.

Another object is to provide a novel device for plug-on connection between a record changer switch and an amplifier.

A further object is to provide a novel combination record changer switch and amplifier connector with means provided therebetween for connection of the switch to the record changer motor.

Another object is to provide a low cost connector for a record changer switch to connect the switch to both a record changer motor and to an amplifier, thus eliminating additional operations, including avoiding solder operations.

Yet another object of this invention is to provide a switch connector having crimp on terminals.

These and other objects of the invention will become clear from the following detailed discussion of the invention in conjunction with the appended claims and drawing wherein:

Figures 1, 2, 3:
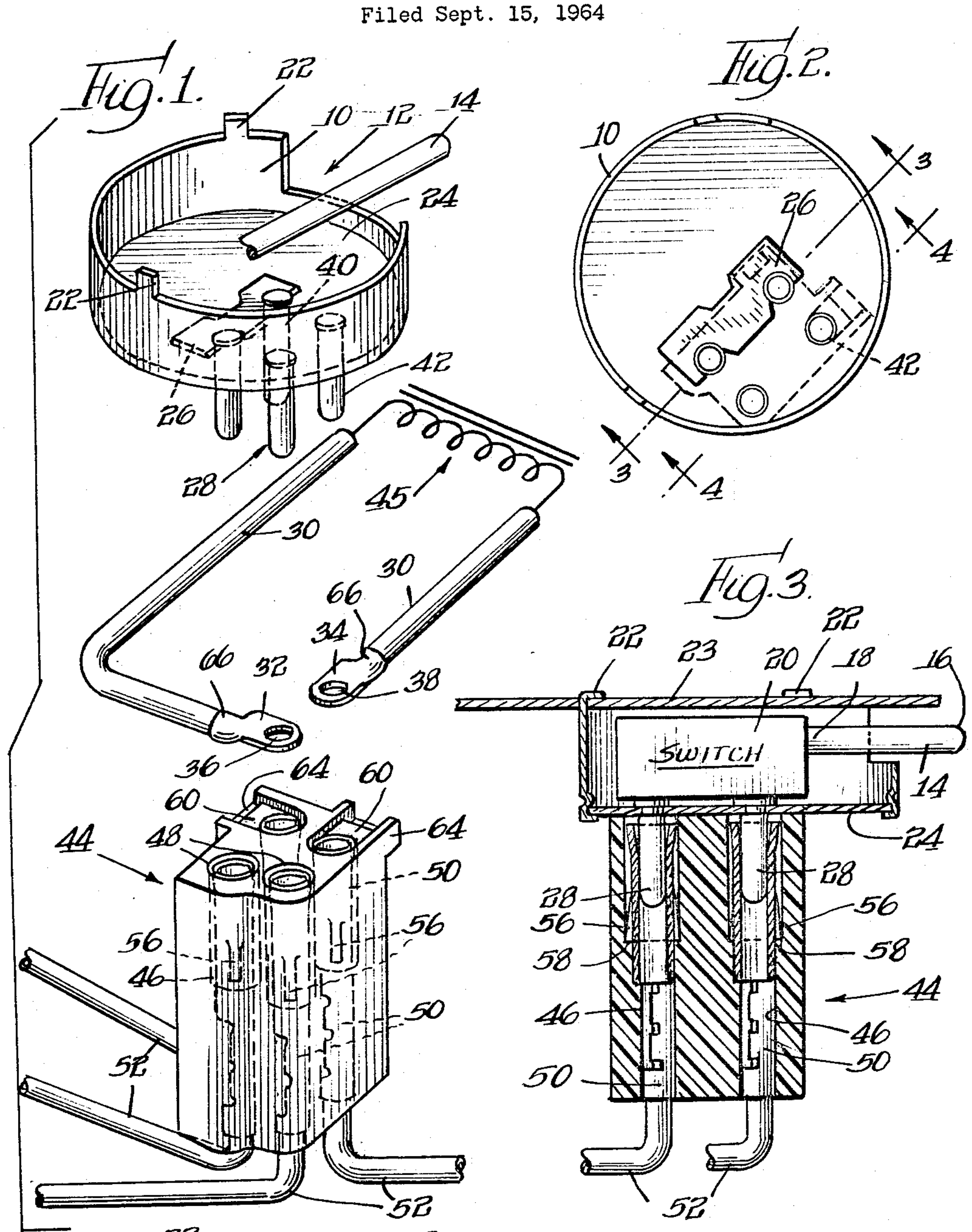
FIG. 1 is an exploded perspective view of an embodiment of the record changer switch and connector assembly of the invention.
FIG. 2 is a plan view of the embodiment illustrated in FIG. 1.
FIG. 3 is an elevational view in section taken along lines 3—3 of FIG. 2.
Figure 4:
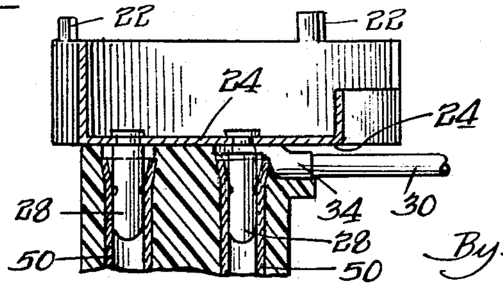
FIG. 4 is an elevational view in section taken along lines 4—4 of FIG. 2.

Referring now more specifically to the figures, a metallic switch housing 10 is shown in FIG. 1, being generally cylindrical in shape and having a circumferential cutout portion 12 adapted to receive a switch arm 14 connected to a conventional record changer switch 20, FIG. 3.

Switch arm 14 has an outer end 16 and an inner end 18 secured to switch 20 fastened within the switch housing 10.

Switch housing 10 is open at the top and is provided advantageously with a plurality of upwardly extending tabs 22, although a screw mounting may be used when a positive ground is required. The tabs are inserted into appropriate openings in the bottom 23, of a phonograph record changer and are then bent over as indicated in FIG. 3 to secure the switch to the record changer. The metal housing has a bottom 24 formed of an electrically insulative material with a movable metal plate or shorting bar 26, FIG. 2, positioned over the bottom to make electrical contact as moved by the switch mechanism 20.

The bottom 24 has a plurality of longitudinally depending pins or protuberances 28, shown as cylindrical, which extend downwardly from the bottom of the housing. The pins 28 are connected suitably to the bottom of the housing, as by staking or the like, with a pair of the pins contactable by metal plate 26. (Obviously two pairs of pins would be engaged respectively by two metal plates in the case of a double pole switch.) Another pin may be grounded by suitable connecting means to the metallic sides of the housing. Alternatively, a pin formed integral with the record changer pan may be received in the receptacle for grounding.

A pair of leads 30, FIG. 1, each lead having crimp-on terminals 32, 34 at its one end, is provided for connection to a record changer or phonograph motor. The motor terminals 32, 34 having openings 36, 38 adapted to fit over two of the male pins 40, 42. A connecting device or receptacle 44 formed of a moldable insulative plastic completes a switch-connector assembly. The phonograph motor is schematically partially shown at 45.

Receptacle 44 has a plurality of longitudinally extending substantial vertical bores 46 therein generally in line with and adapted to receive the pins 28. The bores 46 are cylindrical in shape and have countersunk upper ends 48. The bores are sufficiently large in diameter to receive a plurality of longitudinally extending pin type female terminals 50 of the crimp type, crimping on to amplifier wires 52 leading to an amplifier. The female terminals fit slidingly within the cylindrical bores and have a plurality of outwardly extending wings 56, FIG. 1, which are pushed radially inwardly upon insertion of the terminals upwardly into the bore, but which tend to press radially outwardly against the inner sides of the bore to hold the terminals snugly within the bore.

The receptacle 44 provided is generally rectangular in shape but is not necessarily so and may be provided with the number of bores required dependent on the male pins provided in the record changer switch housing. The manner in which the female terminals 50 fit within the receptacle bores should be clear from FIGS. 1, 3, showing wings 56 adapted to hug the sides of the bore. The bore is provided with a counterbore 58 of slightly greater diameter than the balance of the bore so that once the female terminals have been inserted in the bore, the wing-like, lateral flanges 56 arrest movement of the terminals downwardly.

While a particular female terminal has been shown, it should be clear that the example given is illustrative only and not limiting.

Positioning barriers or terminal supports are provided in the plastic receptacle to hold the terminals 32, 34 and comprises a slotted or cutout portion 60, FIG. 1, having a substantially flat horizontal surface extending radially outwardly from a pair of the receptacle bores and two cup-shaped or U-shaped outwardly extending supports 64 for the body 66 of the terminals. The parts can be reversed with the terminal supports formed on the underside of the insulating bottom 24. The cup-shaped support surface 64 has two sides and a bottom which are stepped down from the substantially flat upper surface 60 so as to be generally complementary to the shape of the motor terminals and to hold the terminals firmly in place when the male pins 28 are inserted in the female terminals 50, and to insulate the terminals.

The female terminals 50 are adapted to hug the outer surface of the pins 28 resiliently; conventional inwardly directed dimples or fingers, not shown, similar to the outwardly directed wings 56 may be provided on the inner surface of the female terminals for the purpose of firmly holding the outer surface of the male pins 28.

Having now described the invention, its operation should be clear; however, for purposes of a better understanding thereof, its manner of operation will be explained without numerical reference.

A plurality of downwardly extending male pins are secured to the bottom of a conventional switch housing. Crimp-on terminals or wires leading to a record changer or phonograph motor are provided with circular openings of substantially the same size as the outer circumference of the male pins and adapted to readily slide over the male pins.

A connector receptacle is formed of moldable plastic material, as of certain of the phenolic materials, to afford a high degree of electrical insulation. The receptacle is provided with a plurality of bores of the same number and in substantially the same location with respect to one another, as the male pins which are provided in the switch housing so as to receive the pins therein. The bores are adapted to receive conventional pin type female terminals each having crimp-type wire engaging lower portions adapted to be crimped onto wires to be connected to a phonograph amplifier or the like.

The female terminals are formed advantageously of stamped sheet metal construction and are generally hollow and tubular in construction, being adapted to hug the inside of the receptacle bore. The female terminals may be provided with a plurality of outwardly extending wings adapted to hug the inner portion of the bore and to snap into place within a counterbore bottom surface to arrest movement of the female terminals downwardly with respect to the bore after once being positioned therein.

To connect the record changer switch to a phonograph or record changer motor and to an amplifier, it is a relatively simple matter utilizing the connector switch combination provided. Pin type female terminals provided are crimped onto the ends of wires leading to an amplifier and are then pushed into place within the receptacle bores. The female terminals hug the sides of their respective bores to hold the terminals firmly within the bores against movement outwardly therefrom. End terminals connected to wires leading to the record changer are provided with openings which are merely slid into position over the switch pins. The switch connector receptacle is then positioned in line with and beneath the male pins, and it is pushed into position about the male pins. The female terminals within the bores of the connector firmly secure the connector to the switch pins.

While a specific embodiment of the invention has been described above, the invention should not be limited thereto since many modifications of the invention may be made by those skilled in the art. Thus, it is contemplated by the appended claims to cover all such modifications as fall within the true spirit and scope of the invention.

The invention is hereby claimed as follows:

1. A switch connector, comprising a housing having longitudinal and transverse dimensions, a transverse wall in said housing, a switch in said housing disposed longitudinally on one side of said wall and including a moveable switch operator, a plurality of connecting pins fixed to said housing and extending from said transverse wall longitudinally in the opposite direction from said switch and also extending through said transverse wall toward said switch, a complementary separable electric connector having a housing with a plurality of female electric connectors respectively detachably receiving said pins, said connector housing having a pair of recesses each opening longitudinally of said female connectors and laterally thereof, a pair of wires each having an apertured terminal thereon, each of said apertured terminals being received on one of said pins and disposed in one of said connector housing recesses, said connector housing and said transverse wall of said first-mentioned housing cooperating to insulate said terminals electrically.

2. A switch connector as set forth in claim 1 wherein each terminal comprises a sleeve crimped on a wire and a flat apertured end, the connector housing adjacent to each recess being stepped to provide a stepped recess, each recess respectively being complementary to one of said terminals.

3. A switch connector as set forth in claim 2 wherein the connector housing has a pair of lateral projections respectively extending said recesses.

No references cited.

ROBERT K. SCHAEFER, *Primary Examiner.*

D. SMITH, Jr., *Assistant Examiner.*